(12) United States Patent
Gumley et al.

(10) Patent No.: US 6,226,166 B1
(45) Date of Patent: May 1, 2001

(54) TRANSIENT OVERVOLTAGE AND LIGHTNING PROTECTION OF POWER CONNECTED EQUIPMENT

(75) Inventors: John Richard Gumley, Kettering; Christopher John Kossmann, New Town, both of (AU)

(73) Assignee: Erico Lighting Technologies Pty LTD, Tasmania (AU)

( * ) Notice: Subject to any disclaimer, the term of this patent is extended or adjusted under 35 U.S.C. 154(b) by 0 days.

(21) Appl. No.: 09/402,334

(22) PCT Filed: Nov. 28, 1997

(86) PCT No.: PCT/AU97/00814

§ 371 Date: Feb. 7, 2000

§ 102(e) Date: Feb. 7, 2000

(87) PCT Pub. No.: WO98/45919

PCT Pub. Date: Oct. 15, 1998

(51) Int. Cl.[7] ....................................... H02H 1/00
(52) U.S. Cl. ............................. 361/118; 361/58; 361/111; 361/115
(58) Field of Search .................. 361/9, 10, 58, 361/111, 113, 115, 118, 119, 127, 15

(56) References Cited

U.S. PATENT DOCUMENTS

| 4,152,743 | 5/1979 | Comstock | 361/56 |
| 4,347,539 | 8/1982 | Peterson et al. | 361/16 |
| 4,477,857 | 10/1984 | Crocker | 361/119 |
| 4,571,656 | 2/1986 | Ruckman | 361/56 |
| 5,339,210 | * 8/1994 | Howell | 361/9 |

FOREIGN PATENT DOCUMENTS

| 289 455 A7 | 5/1991 | (DE) | H02H/9/06 |
| 0 278 748 A2 | 8/1988 | (EP) | H05K/1/16 |
| 0 716 494 A1 | 6/1996 | (EP) | H02H/9/04 |

* cited by examiner

*Primary Examiner*—Stephen W. Jackson
(74) *Attorney, Agent, or Firm*—Renner, Otto, Boisselle & Sklar, LLP

(57) ABSTRACT

An overvoltage protection circuit is provided for protecting electrical equipment from transients on power lines (41, 42). The circuit has a string of series-connected silicon avalanche diodes (SADs) (40) connected across the power lines (41, 42) to provide an initial clamping threshold before energy-absorbing modules (43a, 43b, 43c) come on line to provide secondary clamping. The modules (43a, 43b, 43c) include a number of metal oxide varistors (MOVs) (44) connected in parallel and a switching device in the form of a gas arrester (45) connected in series with the MOVs (44). A resistance (46) is connected in parallel with the gas arrester (45) to form a high pass filter with the natural capacitance of the MOVs (44). This maintains the voltage across the resistance (46) well below the switch operating level during normal conditions and enables a component such as a 230 V fast acting gas arrester (45) to be used. In an alternative embodiment, the gas arrester (45) may be replaced by a solid state switch, such as a Sidator or a Triac.

30 Claims, 4 Drawing Sheets

TRANSIENT OVERVOLTAGE AND LIGHTNING PROTECTION OF POWER CONNECTED EQUIPMENT

TECHNICAL FIELD OF THE INVENTION

This invention relates to transient overvoltage and lightning protection of power connected equipment, and is particularly concerned with providing an improved circuit for providing such protection.

DESCRIPTION OF THE RELATED ART

Power line transients are caused by line faults, switching of inductive circuits and power factor correction capacitors, lightning surges etc. While there are many techniques and devices used to clamp such overvoltages, there are only a few key parameters which are dominant in describing their performance. These are the energy absorption ability of the device, the voltage clamping level for a given pulse current, the pulse polarity and waveshape, and the speed of response.

Various devices have previously been used to achieve overvoltage protection from power line transients. Such devices include Silicon Avalanche Diode (SADs) Metal Oxide Varistors (MOVs), Spark Gaps and Gas Arresters.

Each of these devices have their own technical advantages and disadvantages which are summarised below.

SADs

These are improved zener diodes, which may be unipolar or bipolar devices, to which heat sinking has been added to the substrate to improve their short term energy handling capability. They are noted for their very fast response time with break over into avalanche mode occurring in approx 1 nanosecond. SADs have a very good clamping ratio with a multiplier of only 1.5 from avalanche onset to peak current rating. For example, a diode with clamping onset at 36V will only rise to 54V when impressed with maximum rated impulse current The disadvantage of SADs is that their cost versus peak current ratio is high when compared with other devices such as MOVs. A further disadvantage is that their peak impulse current rating is quite low compared with other technologies, irrespective of cost.

MOVs

These devices can handle many kiloamps of impulse current. They are low cost devices which may be batch selected for paralleling. MOVs have a non linear voltage/current clamping curve and, therefore, cannot normally be paralleled with other devices such as SADs. The relatively poor generic clamping ratio of MOV technology in a paralleling situation would mean that the SADs would absorb the most energy and will catastrophically fail before the high energy capability of the MOV can be realised.

Spark Gaps

These are high current devices that break over at normal air pressure with impulse voltages near 3 kV. Lower voltages are not normally practical due to the very small gaps required. Small gaps rise the problem of vaporised metal bridging the gap and causing premature circuit failure. However, the spark gap has the advantage of a very low arc voltage, typically in the order of 50V. This is excellent for surge diversion, but precludes their use on power circuits unless special measures are taken to restrict power follow current. Spark gaps fall into the generic category associated with crowbar devices.

Gas Arresters

These devices are also spark gaps but within a medium of low pressure rare gas. The gas allows the strike voltage to be lowered to values in the range of 90–500V. When connected to power circuits, they have the same problem as normal spark gaps. They exhibit a low arc voltage which will lead to high power follow currents.

There have previously been proposed various combinations of the devices described above for overvoltage protection. For instance, it is possible to connect high voltage diodes in parallel across a power line to clamp transients on the power line and to provide a higher current rating than a single high voltage device. However, this is not necessarily good practice owing to the relatively wide production spread in voltage tolerance. Alternatively, several strings of series-connected low voltage SADs could be connected in parallel to increase their peak current rating, but at a significantly higher cost.

It has also been proposed to place MOVs in parallel with one or more SADs to provide secondary protection. This procedure is carried out in the knowledge that the SAD primary protection will fail at relatively low energy levels. Within these prior art technologies, there is no grading of energy absorption in the transition from one technology to another. The low protective voltage afforded by the SADs will disappear upon their failure, and there will appear in place a much higher voltage protective level.

One possibility would be to lower the rated voltage of the MOVs to make them absorb more of the impulse before failure of the SADs. However, if this were to occur, the MOVs would then draw continuous current from the power supply and consequently overheat.

It is therefore desirable to provide an improved overvoltage and lightning protection circuit and method for protecting electrical equipment from transients in which at least some of the disadvantages of the prior art are alleviated.

SUMMARY OF THE INVENTION

According to one aspect of the invention there is provided an overvoltage protection circuit comprising:
at least one energy-absorbing module;
said energy absorbing module including:
at least one metal oxide varistor (MOV);
a switching device connected in series with said at least one MOV, and a resistance or impedance connected in parallel with said switching device, said resistance or impedance forming a high pass filter with capacitance of the at least one MOV.

According to another aspect of the invention there is provided a method of protecting electrical equipment from overvoltages caused by transients on power lines of an a.c. power supply including the steps of: connecting at least one metal oxide varistor (MOV) across said power lines to absorb energy from a transient, said method being characterised by connecting a switching device in series with said at least one MOV to isolate said at least one MOV from the a.c. power supply in the absence of a transient on the power lines, and connecting a resistance or impedance in parallel with said switching device so as to form a high pass filter with capacitance of the at least one MOV.

Preferably, in the overvoltage protection circuit and method of the invention, a plurality of series-connected avalanche diodes are connected across the a.c. power supply to provide initial, high speed clamping before the at least one high energy absorbing MOV is brought on line.

Preferably, the switching device is arranged to connect the at least one MOV to the power lines to provide secondary clamping when a triggering threshold voltage induced by a transient is reached on the power lines. The voltage characteristic of the MOV or MOVs is preferably such that the voltage does not increase above the limit for the SADs at maximum peak impulse current. The switching device is preferably also arranged to disconnect the MOV or MOVs at the end of the transient The switching device preferably has a pre-determined holding current below which the switch resets and disconnects the MOVs. This prevents MOV failure which could otherwise result from the drawing of current continuously from the power supply.

Preferably, two or more MOVs are connected in parallel in the energy absorbing module to improve lifetime characteristics, the switching device being connected in series with the MOVS.

The MOV or MOVs may have sufficient natural capacitance to form the high pass filter with the resistance or impedance. Alternatively, a capacitance may be connected in parallel with the at least one MOV to supplement the inherent capacitance of the MOV or MOVs. Such a high pass filter arrangement is required so as to ensure that mains voltage across the energy absorbing module does not appear totally across the switching device, causing the switching device to trigger and start conducting. At low frequencies, such as 50 Hz, very little voltage appears across the resistor or impedance and hence the switching device. However, in the presence of a higher frequency transient, the voltage across the resistor or impedance increases causing the switching device to trigger.

The arrangement of the circuit components of this invention is also advantageous in that it allows MOVs having an a.c. voltage rating lower than the r.m.s. voltage of the a.c. supply to be used. For instance, for an a.c. power supply of 220–240V r.m.s., the MOV or MOVs preferably have, but are not restricted to, a voltage rating falling substantially within the range from 150V a.c. to 230V a.c. For an a.c. power supply of 110–120V r.m.s. MOVs having a voltage rating from about 50V a.c. to about 115V a.c. may be used. This is similarly the case for other supply voltages.

Preferably, the avalanche diodes are high speed, low voltage devices, such as SADs, which typically have an energy rating falling substantially within the range from 0.5 to 15 kW and more preferably about 1.5 kW. The SADs are preferably arranged to provide an initial clamping voltage above the peak voltage of the a.c. power supply. The secondary clamping provided by the energy absorbing module preferably takes place at a clamping voltage higher than the initial clamping voltage provided by the series-connected avalanche diodes.

In the case of a 220–240V a.c. power supply, a sufficient number of SADs may be connected in series to provide an initial clamping threshold of about 400V, a value 60V above the a.c. peak voltage of 340V. In this case, the secondary clamping voltage preferably falls within the range from 420V to 530V. The clamping voltages may be varied for other supply voltages.

SADs are a class of diode having a specific energy rating which does not vary with clamping level. This means that a string of series-connected low voltage diodes will have a higher current rating than a single high voltage device.

An alternative would be to parallel high voltage diodes to achieve the same result. However, this is not necessarily good practice due to the relatively wide production spread in clamping voltage tolerance. A series string of diodes can achieve a very accurate clamping threshold by utilising a "select on test" production technique wherein the last diode inserted is selected for clamping voltage in accordance with the clamping level of the aggregate of the preceding diodes.

Such a diode string producing a clamping threshold of about 400V and, using 1.5 kW diodes would, for example, produce an upper clamping limit of around 600V on a maximum energy pulse of 200A×8/20 usec. The use of 5 kW diodes would still produce an upper voltage of 600V, but at a correspondingly higher peak pulse current.

This diode string has the advantage of speed in operation and a good clamping ratio, but the current at peak energy level is not high. In order to achieve a 3000A×8/20 usec rating, some 13 paralleled strings of 14 series connected 33V, 1.5 kW diodes would be required, all of which would need accurate matching of threshold voltage during production. In the case of 5 or 15 kW diodes the number of strings can be reduced, but at the expense of a considerable increase in diode cost The assembled cost of a series/parallel arrangement to achieve a 3000A×8/20 usec rating is relatively high. In the case of the use of 1.5 kW diodes a total of 182 pieces would be required, with 13 "select on test" operations required during assembly. Similar conditions will apply for designs using other waveshapes.

The present invention enables all but one diode string to be dispensed with; one diode string being retained for speed of operation and to produce initial clamping before at least one high energy absorbing lower cost module is brought on line.

The switching device of the at least one module may comprise a solid state switch, such as a device known as a "Sidactor", a triac switch or a silicon controlled rectifier (SCR). Alternatively, the switching device may comprise a gas arrester. Preferably for a 220–240V r.m.s. a.c. power supply, a gas arrester having a nominal sparkover voltage in the range of 200–400V is used. One such arrester having a sparkover voltage of about 230V is available from the Siemens company and can respond almost as quickly as a solid state switch with a higher current rating.

Whilst the circuit of the present invention provides effective overvoltage protection, it is possible that one or more components of the circuit could fail. Accordingly, one or more fuses may be provided for the string of series-connected avalanche diodes, the MOVs and/or the gas arrester or solid state switch. In a particularly preferred embodiment, a first fuse connected in series with the string of series connected avalanche diodes and a fuse or fuses connected in series with said at least one MOV are formed by fuse tracks on a printed circuit board, the fuse tracks are covered by an insulating film, a continuous line of conductive ink is provided on the insulating film over the fuse tracks, and the line of conductive ink is connected to a sensing circuit for detecting operation of the fuses.

According to a further aspect of the invention there is provided a method of detecting operation of one of a plurality of fuses in an overvoltage protection circuit, said method comprising the steps of:

forming said plurality of fuses as fuse tracks on a printed circuit board;

providing a layer of insulating film over said fuse tracks;

providing a continuous line of conductive ink on said layer of insulating film; and connecting said continuous line of conductive ink to a sensing circuit, wherein the sensing circuit is arranged to detect a rupture of said line of conductive ink caused by operation of any one of said fuses.

Various embodiments of the invention will now be described by way of example only, with reference to the accompanying drawings.

DETAILED DESCRIPTION OF THE INVENTION

Figure 1:
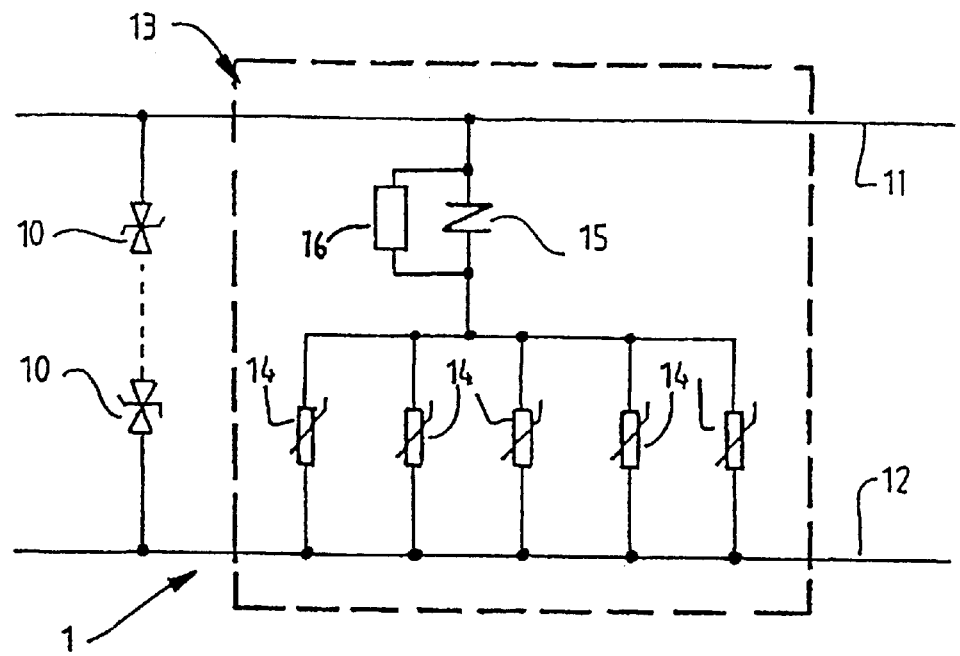
FIG. 1 is a circuit diagram of a first embodiment of the invention.

The overvoltage protection circuit 1 of FIG. 1 comprises a plurality or string of avalanche diodes 10 connected in series across a.c. power supply lines 11 and 12 for electrical equipment, and a high energy absorbing module 13 connected in parallel with the avalanche diode string across the power supply lines.

Each of the avalanche diodes 10 is preferably a low voltage SAD having an energy rating between about 0.5 kW to 15 kW. For a 220–240V a.c. power supply, the diode string preferably contains a sufficient number of SADs to provide a clamping threshold of about 400V, some 60V above the peak a.c. supply voltage of about 340V.

In a practical case example, 11×36V diodes rated at 1500W peak pulse power may be series connected to provide a clamping threshold of 396V.

The high energy module 13 in the circuit of FIG. 1 comprises a plurality of metal oxide varistors MOVs 14 connected in parallel, and a solid state avalanche switch 15 connected in series with the plurality of MOVs. Each MOV preferably has a voltage rating of approximately 175V a.c. The solid state avalanche switch 15 preferably comprises a device known as a "Sidactor", manufactured by Teccor Industries having a minimum threshold of about 140V, a maximum threshold of about 220V and a typical rating of 3000 A on 8/20 usec impulse. Similar components and products are available from other manufacturers which can be used in this invention. A resistance or impedance 16, in the form of a resistor or inductor or resister/inductor combination is connected in parallel with the switch 15 so as to form a high pass filter with the MOVs 14 which have some natural capacitance.

A switching device such as a Sidactor is broadly categorised as having a crowbar characteristic. This is, when a preset threshold is reached, the device changes from a high impedance state to one of very low impedance. Reset occurs when the residual current drops below a certain minimum. It is not possible to use this type of device in isolation, as it will effectively short circuit the power supply.

As described above, a number of paralleled 175V ac metal oxide varistors or surge arresters 14 are placed in series with the solid state switch 15. One characteristic of the combination is that at 50 mA, the clamping voltage of the MOVs 14 is 310V which, when added to the 140V threshold of the switch 15 means that 450V is required to cause triggering. It is a characteristic of the switch 15 that it can have an upper avalanche threshold of 220V. Therefore, the module 13 will trigger into conduction in a window which lies between 450V and 530V. These switching levels remain within the clamp range of the string of diodes 10.

Once the module conducts, the switch 15 is in the low impedance state with only a 5V drop during passage of a 3000A×8/20 usec surge. The 175V ac MOVs 14 are now effectively connected across a 240V ac circuit. They will clamp at a voltage level depending on the impressed peak current While it is possible to use a single MOV in series with the solid state switch 15 preferably two or more MOVs 14 are connected in parallel for improved lifetime characteristics. If there is a single 175V, 20 mm disc MOV, then clamping will be as follows:

50 mA=310V
100 mA=350V
1 Amp=380V
10 Amp=400V
100 Amp=460V
1000 Amp=580V

Since the switch 15 cannot maintain conduction below 50 mA, any voltage below 310V will cause conduction to cease. In the few milliseconds that the supply voltage is between 310V and the peak value of about 340V, the maximum peak current will be less than 100 mA, a value well within the MOV rating. Also, if there are 5 paralleled MOVs 14 to improve lifetime characteristic as shown in FIG. 1, then each MOV 14 will carry less than 100 mA. The total current flow at peak supply voltage of 340V, in the absence of the surge current, will be under 500 mA.

It is possible to have two or more high energy modules 13 arranged in parallel to increase the overall peak current capacity. Even though their threshold may vary according to device production spread, it should not affect operation. This is because the rise of peak current will cause the clamping voltage to rise. The module with lowest breakover threshold will operate first and the rest will come on line sequentially according to the level of their breakover voltage.

There are a number of variations in circuity which will also meet the principals of this invention. One such variation is shown in FIG. 2.

Figure 2:
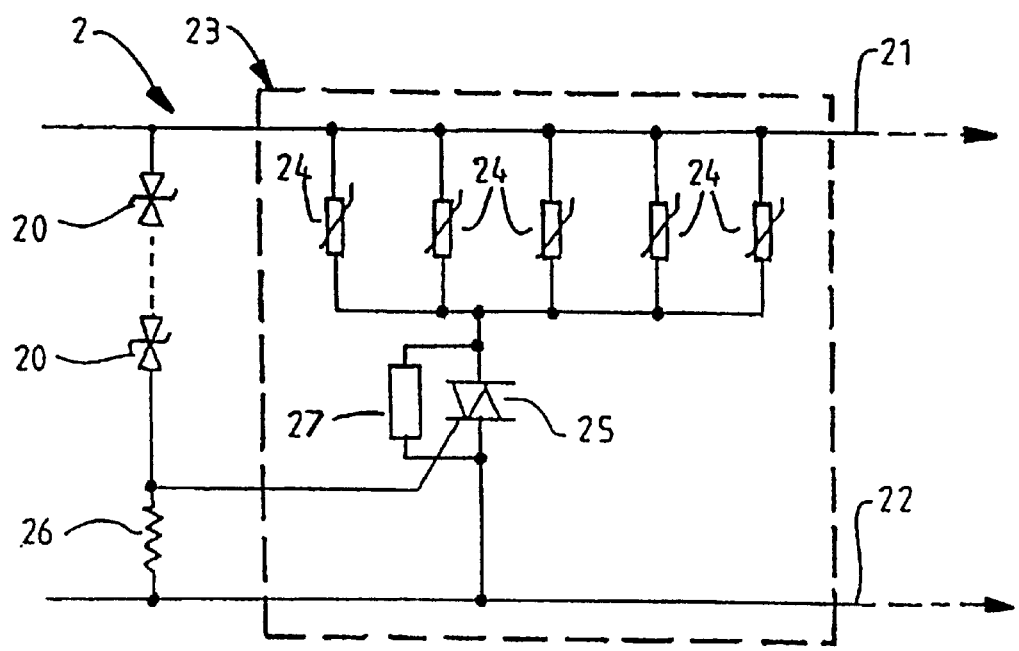
FIG. 2 is a circuit diagram of a second embodiment of the invention.

The overvoltage protection circuit 2 shown in FIG. 2 is similar to that of FIG. 1 in that it comprises a string of avalanche diodes 20 connected in series across a.c. power supply lines 21 and 22 and a high energy absorbing module 23 connected in parallel with the avalanche diode string, the module 23 including a plurality of MOVs 24 connected in parallel.

The circuit of FIG. 2 differs from that of FIG. 1 in that the module 23 includes a Triac switch 25 instead of the Sidactor 15 of the module 13 of FIG. 1. The Triac switch 25 is connected in series with the paralleled MOVs 24 and is also connected to a resistor 26 in series with the string of avalanche diodes 20. Connected in parallel with the switch 25 is a resistance or impedance 27 (FIG. 2), 37 (FIG. 3), which forms a high pass filter with the MOVs 24 which have some natural capacitance. The resistor 26 will typically have a low value, for example 0.1 ohm. The voltage source for triggering the Triac switch 25 is derived from the resistor 26. Two or more Triac switches arranged in parallel may replace the single Triac switch of FIG. 2. It is also possible to use one or more reverse polarised silicon controlled rectifiers (SCRs) instead of the Triac switch 24 or a plurality of Triac switches arranged in parallel. This may provide the advantage of greater pulse current rating, for example 5 kA, 8/20 usec. However, additional external components may be required for triggering, at increased cost.

A feature of the circuit of FIG. 2 is that there can be set a more precise triggering threshold. For example, a 50 Amp pulse through the string of diodes 20 can produce a 5V drop across the 0.1 ohm resistor 26. This is sufficient to trigger the triac 25. The input pulse voltage at this moment in time would approximate 460V, but with 5×20 mm paralleled disc MOVs 24 each would take 10 Amps and immediately lower the clamping level to 400V. The module 23 now takes the load from the string of diodes 20 which will revert to below their threshold of conduction.

A continuing increase in pulse current to 5000A would see each MOV 24 absorbing 1000A and producing a clamp level of 580V. At this voltage, the diode string would be near but not exceeding maximum operating voltage.

Figure 3:
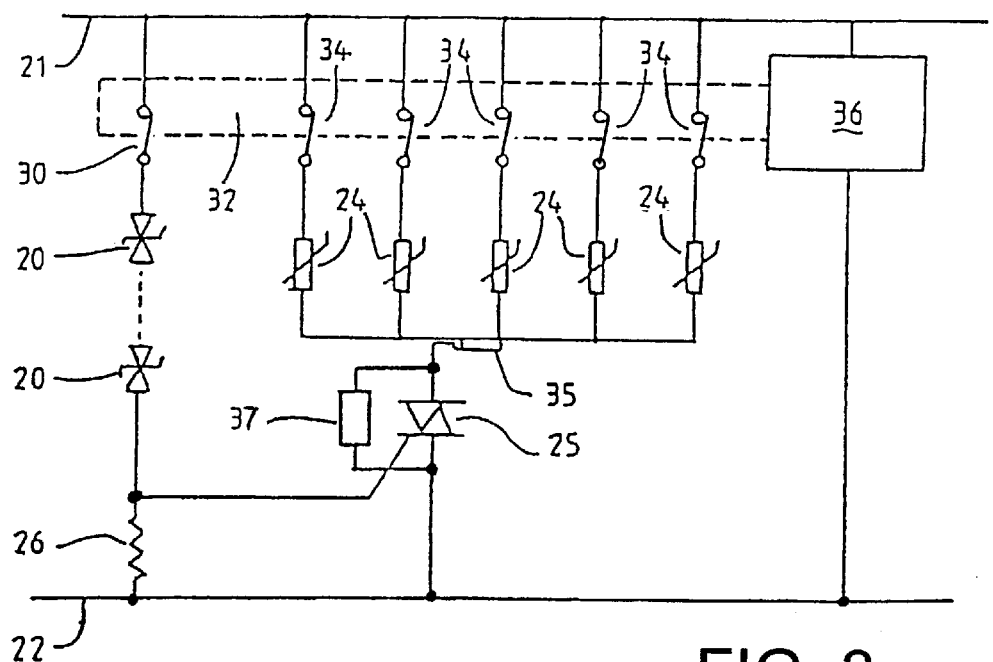
FIG. 3 is a diagram similar to FIG. 2 including a fuse failure sense and display circuit.

In the circuit of FIG. 2, there are three possible forms of component failure which require safety protection. FIG. 3 shows a modified circuit with fuse protection and an improved method of detecting fuse operation. FIG. 3 is similar to FIG. 2 and corresponding reference numerals have been applied to corresponding parts.

The first possible source of component failure is a short circuit diode in the string of avalanche diodes 20, placing the remaining diodes under greater stress. This can create a domino effect and lead to all diodes 20 becoming short circuited. This is prevented by connecting a first fuse 30 in series between the supply line 21 and the string of avalanche diodes 20.

The MOVs 24, despite an estimated 10,000 impulse life rating at peak impulse current, may also fail into a low impedance state. This can be prevented by connecting a respective fuse 34 between each MOV 24 and the power supply line 21.

The third component which could be overstessed and also fall into a low impedance state is the solid state switch 25. In this case 220–240V ac could be permanently applied to the MOVs 24 rated at 175V ac. This would cause them to draw a continuing current and overheat. This can be overcome by providing a thermal fuse 35 in the series line connecting the switch 25 to the MOVs arranged in parallel.

As shown in FIG. 3, in the case of the first two failure modes, there are six fuses 30, 34 in line with the string of diodes 20 and the 5 MOVs 24. It is desirable to know if any fuse has operated and to signal the user that the device has been compromised. A space saving aspect of this invention is to use a printed circuit track to act as the fuses 30, 34 as shown in FIG. 3.

The method of detecting fuse operation involves the screening of an insulating film of epoxy resin over copper fuse tracks for the fuses 30, 34 on the printed circuit board. Thereafter, a continuous line of conductive ink 32 can be screened over all fuses such that the operation of any one will cause rupture of the overhead conductive ink. This continuous conductive ink layer is then placed in series with a sensing and display circuit 36 which will detect any ink rupture caused by operation of a fuse 30, 34. The epoxy film underlaying the conductive ink acts to insulate the ink from the fuse tracks, and will allow the sensing and display circuit 36 to operate at any desired voltage.

Figure 4:
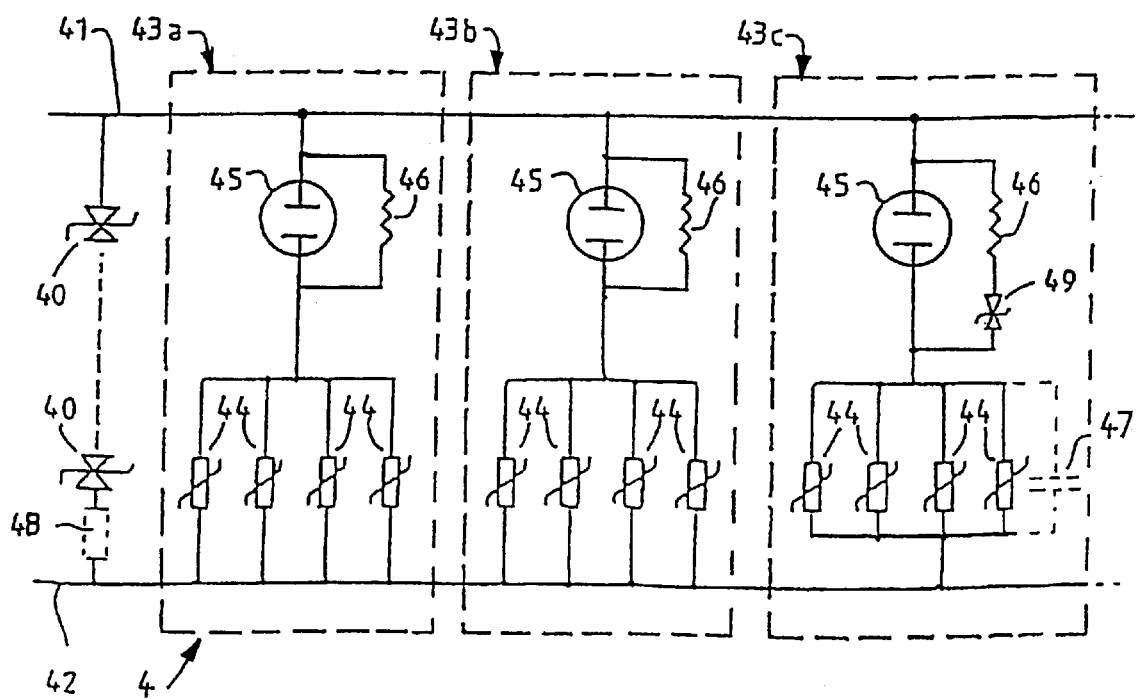
FIG. 4 is a circuit diagram of another embodiment of the invention.

Another preferred embodiment of an overvoltage protection circuit is shown in FIG. 4. The circuit 4 comprises a string of silicon avalanche diodes (SADs) 40 connected in series across a.c. power supply lines 41 and 42, and a plurality of high energy absorbing modules 43a, 43b and 43c connected in parallel with the avalanche diode string 40.

Each of the SADs 40 is preferably a low voltage diode having an energy rating from about 0.5 kW to about 15 kW, more preferably about 1.5 kW. Preferably, for a 220–240V a.c. power supply, the string of SADs is arranged such that it will not commence clamping until a transient voltage reaches approximately 400V, well above the peak operating voltage of approximately 340V, to allow for fluctuations such as those caused by poor voltage regulation. In a practical embodiment, a string of eleven 36V diodes 40 may be connected in series to provide a clamping threshold of 396V. If diodes rated at 1.5 kW peak pulse power are used, each diode could carry a maximum current of 28A at the maximum terminal voltage of 54V. This current rating is based on a test waveform of 10/1000 usec. The equivalent peak current using an 8/20 usec waveform would be 220 Amps. These are very low values in the norms of transient protection.

Previously, it has been proposed to connect several strings of such SADs in parallel to increase their peak current rating. However, such an arrangement has significant cost implications. The placement of MOVs rated for, say, 275V ac connected in parallel across the diodes is not an alternative solution. The diodes will destruct at their peak clamping voltage of 54×11, or 594V. Since a 20 mm disc MOV will only draw approx 1 Amp at this voltage MOVs will offer virtually no energy relief to the SADs.

In the embodiment of the invention shown in FIG. 4, each of the high energy absorbing modules 43a, 43b, 43c comprises a plurality of metal oxide varistors MOVs 44 connected in parallel, and a switching device in the form of a gas arrester 45 connected in series with the MOVs 44. For a 220–240V a.c. supply, each MOV preferably has a non-standard voltage rating of between about 150V a.c. to about 230V a.c. This rating level lowers the MOV peak impulse voltage to a value near or below the maximum permissible value of the SADs.

Each gas arrester 45 (or solid state switch in FIGS. 1 to 3) has the effect of isolating the MOVs 44 from the power circuit until a transient pulse arrives. The gas arresters 45 thus act as a switch to connect and disconnect the MOVs 44. The switching action of the gas arresters 45 will sure disconnection of the MOVs 44 after passage of a transient pulse, thus preventing MOV failure due to the drawing of continuing current from the power supply.

In accordance with a firer advantageous feature of the invention an impedance, such as a resistor 46 an inductor or an inductor/resistor combination is connected in parallel with each gas arrester 45 so as to form a high pass filter with the MOVs 44 which have some natural capacitance.. This may be achieved by using resistors 46 of the order of 100 kohm. At low frequencies, such as 50 Hz, the current through the R/C series circuit is so low that very little voltage appears across the resistor 46 and gas arrester 45. In the presence of a transient, the capacitance of the MOVs produces a low impedance, allowing a higher current and raising the voltage across the resistor 46 to trigger the gas arrester 45. In some circumstances, an additional lumped capacitance 47 may be connected in parallel across the MOVs as shown in Module 43c.

As shown in FIG. 4, a resistance 48 may be connected in series with the string of SADs 40. During large peak impulse currents, the voltage developed across the MOV/gas arrester combination can exceed the clamping level of the SAD string. The SADs 40 would then be conducting for a significant part of the impulse, possibly exceeding their energy rating and causing failure. By introducing a small resistance 48, typically about 1–2Ω, in series with the SAD string, the current through the SADs 40 can be limited to a level below their maximum rating.

With the high pass filter, the majority of the applied mains voltage appears across the MOVs. This ensures that the Gas Arrester does not fire, but a side effect The MOV capacitance charges and discharges with the mains voltage frequency. Thus, if an impulse occurs when the MOV capacitance is fully charged, the breakover voltage of the Gas Arrester adds to the MOV capacitance voltage producing a higher let-through voltage.

To overcome this side effect, a non-linear element 49 may be introduced into the high pass filter as shown in Module 43c. Typically this element will be either back-to-back zener diodes or a small bi-directional silicon avalanche diode having breakdown characteristics of a zener diode in both directions.

The result is that, until the voltage across the device reaches the breakover voltage of the non-linear element, the voltage will appear across the Gas Arrester rather than the MOVs. After the applied voltage has exceeded the non-linear element breakover voltage, current flow through the high pass filter, thus developing voltage across the MOVs. The net result is that the proportion of mains frequency voltage appearing across the MOVs is reduced, thus reducing the voltage added to the let-through.

Figure 5:
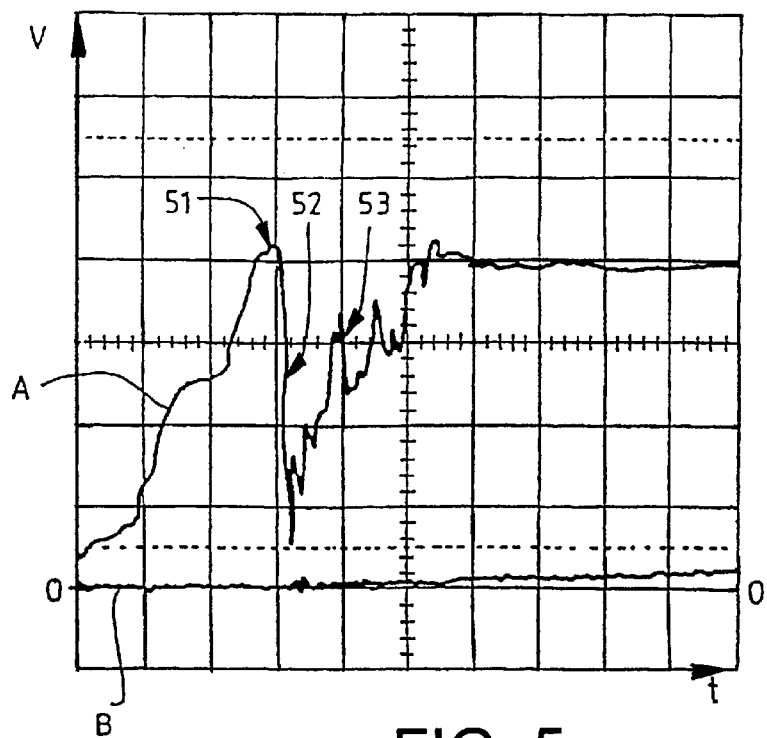
FIG. 5 is a graph showing the effect of the circuit of FIG. 4 when a transient pulse is applied.

The net result of the multi-stage circuit 4 of FIG. 4 is shown in FIG. 5. Line A in FIG. 5 is an oscilloscope trace of the residual voltage which is applied to the equipment protected by the circuit of FIG. 4 when the circuit of FIG. 4 is subjected to a 3000A transient pulse. Each square for trace A represents 0.1 $\mu$s along the x-axis and 100V along the y-axis. Line B is a trace of the 3000A transient pulse applied to the circuit of FIG. 4. Each square for trace B represents 0.1 $\mu$s along the x-axis and 500A along the y-axis.

In FIG. 5, the SADs 40 have commenced their clamping action at 51 being much faster in their action than the gas arresters 45. At point 52, the first gas arrester 45 of module 43a has fired into a low impedance state, and conducts the impulse into the MOVs 44 of the first module. The latter have significant capacitance and so present a low initial impedance. The consequence is that the initial residual voltage will be low. As expected, the MOV voltage will rise as an increasing current flows through the MOVs 44. This is their non linear resistance effect. When the voltage rises further, the gas arrester 45 of the second module 43b will fire at 53 and lower the voltage further. The sequence continues according to how many stages are fitted.

It is not important in which sequence the gas arresters 45 fire. Consequently, their production tolerance is not important It will be noted that the residual voltage at the conduction of the three stages shown has remained in the of 450V, with the applied transient at 3000 Amps. This is well below the maximum permissible voltage for the SADs. The very low residual voltage created by this circuit is also very beneficial for the equipment being protected.

Figure 6:
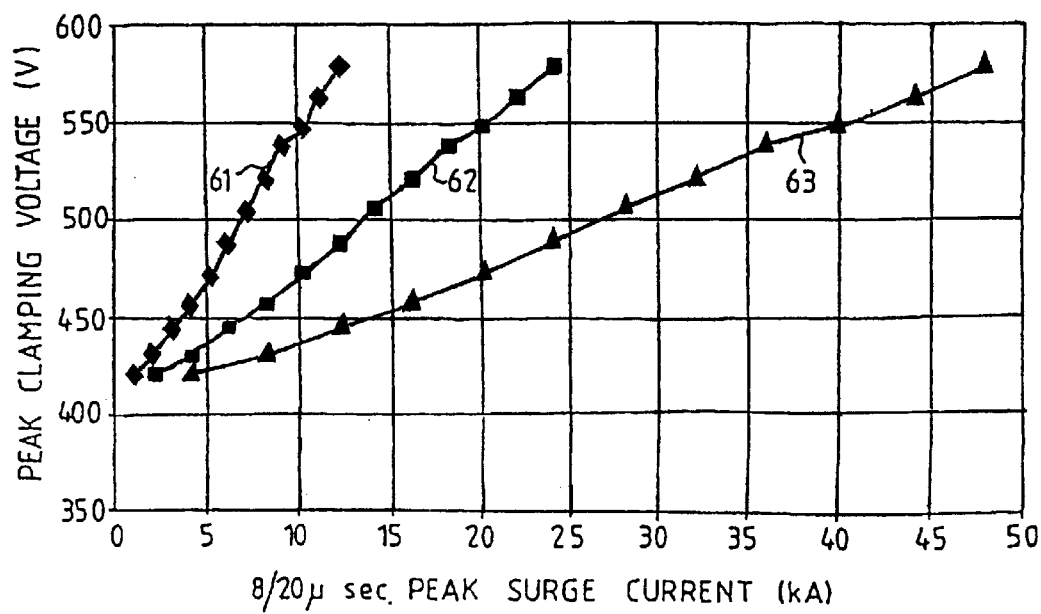
FIG. 6 is a graph showing voltage/current lines for overvoltage circuits of the invention having different stages of high energy devices.

FIG. 6 shows voltage/current curves for different numbers of stages of high energy modules in the circuit of FIG. 4. Line 61 is the voltage/current curve for a circuit having a single high energy module, line 62 is the voltage/current curve for a circuit having two high energy modules connected in parallel; and line 63 is the voltage/current curve for a circuit having three modules connected in parallel. It will be seen from FIG. 6 that the peak clamping voltage may be kept below 600V, even at pulse levels of 50 KA by using a multi-stage arrangement with at least three high energy modules, each having one or more MOVs and a switching device such as a gas arrester or Sidactor. This progressive clamping arrangement would not have been possible in the prior art, since failure of SADs would leave only a 275V MOV which at 50 kA would produce a residual voltage of around 1500V.

Figure 7:
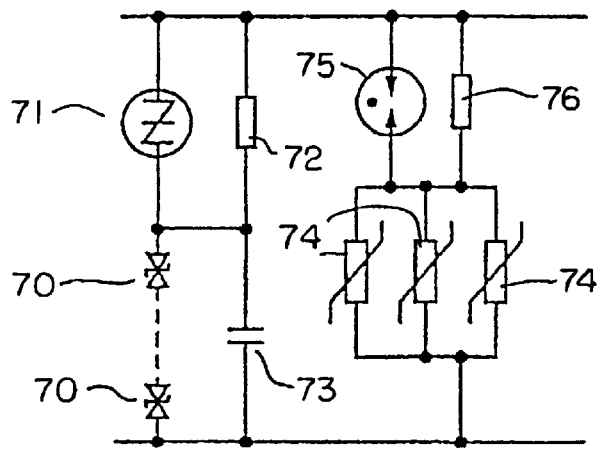
FIG. 7 is a circuit diagram of a further embodiment in accordance with the invention.

In the modified circuit of FIG. 7, the energy-absorbing module is similar to that of FIG. 4 in that it has a plurality of MOVs 74 connected in parallel, a gas arrester 75 in series with the MOVs 74 and a resistance 76 in parallel with the gas arrester 75 forming a high pass filter with the natural capacitance of the MOVs 74. If required, an additional capacitance may be connected in parallel across the MOVs 74 to supplement the natural capacitance of the MOVS. The modified circuit of FIG. 7 differs from that of FIG. 4 in that a switching component 71 is connected in series with the string of SADs 70, and an impedance, such as a resistor 72 is connected in parallel with the switching component 71 and in series with a capacitance 73 to create a high pass filter. In the example shown, a sidactor is being used as the switching component 71. However, this could equally be a Gas Arrester, Spark Gap or similar switching component.

This topology would allow for a lower voltage SAD string, where the switching component is selected to not operate at the Maximum Continuous Operating Voltage (MCOV) rating of the device. However, an impulse would cause the switching component to operate, bringing the SAD string into conduction. Due to the very small capacitance of the SAD string, the additional capacitance 73 is required to create an effective high pass filter.

Figure 8:
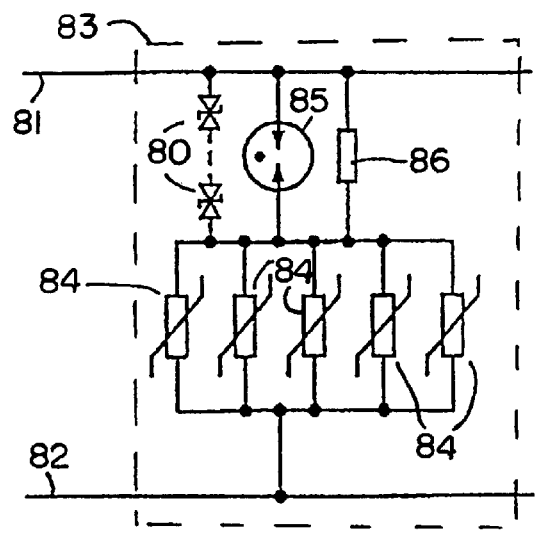
FIG. 8 is a circuit diagram of an alternative embodiment in accordance with the invention.

Referring to FIG. 8, there is shown an alternative embodiment in which a string of SADs 80 are incorporated in an energy-absorbing module 83 connected across a.c. power supply lines 81 and 82. As in FIG. 4, the energy-absorbing module 83 includes a plurality of MOVs 84 connected in parallel, a switching device 85 such as a gas rester connected in series with the MOVs and an impedance 86, such as a resistor, an inductor or a resistor/inductor combination connected in parallel with the switching device 85 to form a high pass filter with the natural capacitance of the MOVs. The SAD string is placed across the switching device to limit voltage overshoot on fist rising transients in the period from switching initiation to full conduction of the switching device.

Figure 9:
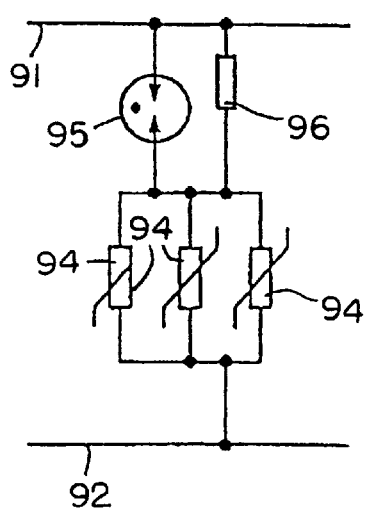
FIG. 9 is a circuit diagram of yet another embodiment.

A simpler alternative arrangement is shown in FIG. 9 in which the SAD string is removed totally. Thus the circuit comprises a string of MOVs 94 connected in parallel, a switching device such as a gas arrester 95 connected in series with the MOVs and an impedance 96, such as a resistor, connected in parallel with the switching device 95 to form a high pass filter with the natural capacitance of the MOVs 94. Although not as effective as the embodiment of FIG. 4, this arrangement could be used for applications where large surge handling capacities are required, but speed of response is not critical.

It will be appreciated that in the present invention, MOVs and a Switching device (solid state switch or Gas Arrester) and in most embodiments, SADs are formed in a special and unique combination which overcome the disadvantages of each component, while maintaining the advantages of each. The present invention provides superior electrical performance than prior art arrangements. It has the speed of operation of the avalanche diodes; it has a higher impulse current rating than the diode matrix concept of the prior art; and it has both lower clamping voltage with a lower construction cost. It also provides an integrated method to protect and detect overcurrent and thermal stress.

The present invention can remain dormant in the presence of high mains supply voltages while clamping transients to low levels. One example is with present UL 1449 test standards in the USA. Surge suppressors mated for 120V rms are expected to withstand 240V rms for 7 hours without catching fire. Normal technologies would require MOVs of 250V rms rating to meet the test whereas prior to this test 130V rms devices would be adequate. The frequency sensitive switching nature of this invention allows continued use of 130V devices with their low voltage protection levels, while retaining the ability to withstand 240V rms for 7 hours without operation of any protective device.

It will also be appreciated that various modifications may be made to the preferred embodiments described above without departing from the scope and spirit of the present invention. For instance, the circuits of FIGS. 4, 7, 8 and 9 could be modified to include fuse protection as described with reference to FIG. 3.

What is claimed is:

1. An overvoltage protection circuit comprising:
    at least one energy-absorbing module, said energy absorbing module including:
    at least one metal oxide varistor (MOV);
    a switching device connected in series with said at least one MOV; and
    a resistance or impedance connected in parallel with said switching device, said resistance or impedance forming a high pass filter with capacitance of the at least one MOV,
    wherein said switching device is configured to turn on in a presence of a transient.

2. A circuit according to claim 1 wherein said high pass filter further includes a non-linear element.

3. A circuit according to claim 2 wherein said non-linear element comprises back-to-back zener diodes or an avalanche diode.

4. A circuit according to claim 1 wherein a capacitance is connected in parallel with the at least one MOV.

5. A circuit according to claim 1 wherein said energy absorbing module includes a plurality of MOVs connected in parallel, said switching device being connected in series with the plurality of paralleled MOVs.

6. A circuit according to claim 1 further including a plurality of series-connected avalanche diodes to be connected across an a.c. power supply.

7. A circuit according to claim 6 wherein the series-connected avalanche diodes are connected in parallel with the at least one energy-absorbing module.

8. A circuit according to claim 6 wherein the series-connected avalanche diodes are connected in parallel with the switching device and in series with said at least one MOV of the at least one energy-absorbing module.

9. A circuit according to claim 7 wherein a resistance is connected in series with the series-connected avalanche diodes.

10. A circuit according to claim 7 wherein a switching component is connected in series with the series-connected avalanche-diodes.

11. A circuit according to claim 10 wherein an impedance is connected in parallel with the switching component and a capacitance is connected in parallel with the series-connected avalanche diodes to form a high pass filter.

12. A circuit according to claim 6 wherein the series-connected avalanche diodes are low voltage silicon avalanche diodes (SADs).

13. A circuit according to claim 6 wherein the series-connected avalanche diodes are arranged to provide an initial clamping threshold above the peak voltage of the a.c. power supply.

14. A circuit according to claim 13 wherein, for an a.c. power supply of 220–240V r.m.s. the series-connected avalanche diodes provide an initial clamping threshold of about 400V.

15. A circuit according to claim 1 wherein the at least one MOV has an a.c. voltage rating less than the r.m.s. voltage of an a.c. power supply across which the overvoltage protection circuit is connected.

16. A circuit according to claim 15 wherein for an a.c. power supply of 220–240V r.m.s. the at least one MOV has a voltage rating falling substantially within the range from 150V a.c to 230V a.c.

17. A circuit according to claim 1 wherein the switching device comprises a solid state switch, and the solid state switch has a minimum switching threshold of about 140V and a maximum switching threshold of about 220V.

18. A circuit according to claim 17 wherein the solid state switch is a Sidactor, a Triac or at least one silicon controlled rectifier (SCR).

19. A circuit according to claim 1 wherein the switching device comprises a gas arrester.

20. A circuit according to claim 19 wherein the gas arrester has a sparkover voltage of less than the peak voltage of an a.c. power supply across which the overvoltage circuit is connected.

21. A method of protecting electrical equipment from overvoltages caused by transients on power lines of an a.c. power supply including the steps of:
    connecting at least one metal oxide varistor (MOV) across power lines to absorb energy from a transient;
    connecting a switching device in series with said at least one MOV to isolate said at least one MOV from the a.c. power supply in the absence of a transient on the power lines and to turn on in the presence of a transient; and
    connecting a resistance or impedance in parallel with said switching device so as to form a high pass filter with capacitance of the at least one MOV.

22. A circuit according to claim 6 wherein a first fuse is connected in series with said plurality of series-connected avalanche diodes and a second fuse is connected in series with said at least one MOV.

23. A circuit according to claim 22 wherein said first and second fuses are formed by fuse tracks on a printed circuit board, said fuse tracks are covered by an insulating film, a continuous line of conductive ink is provided on the insulating film over the fuse tracks, and the line of conductive ink is connected to a sensing circuit for detecting operation of the first or second fuse.

24. A method of protecting electrical equipment from overvoltages caused by transients on power lines of an a.c. power supply including the steps of:
    connecting at least one metal oxide varistor (MOV) across power lines to absorb energy from a transient;
    connecting a switching device in series with said at least one MOV to isolate said at least one MOV from the a.c. power supply in the absence of a transient on the power lines; and
    connecting a resistance or impedance in parallel with said switching device so as to form a high pass filter with capacitance of the at least one MOV.

25. A method according to claim 24 including the step of connecting a plurality of series-connected avalanche diodes in parallel with the switching device to provide high speed clamping at an initial clamping voltage.

26. A method according to claim 25 wherein the switching device is arranged to connect the at least one MOV to the power lines to provide secondary clamping when a triggering voltage induced by a transient on the power lines is reached.

27. A method according to claim 26 wherein the switching device is arranged to disconnect the at least one MOV at the end of a transient, and wherein the secondary clamping takes place at a clamping voltage higher than the initial clamping voltage of the plurality of series-connected avalanche diodes.

28. A method according to claim 27 wherein, for an a.c. power supply of 220–240V r.m.s. the initial clamping voltage is approximately 400V, and wherein the secondary clamping voltage falls substantially within the range from 420V to 530V.

29. A method according to claim 28 wherein a capacitance is connected in parallel with said at least one MOV to supplement the inherent capacitance of said at least one MOV, and wherein the switching device comprises a gas arrester.

30. A method according to claim 29 wherein the switching device comprises a solid state switch, such as a Sidactor, a Triac or at least one silicon controlled rectifier (SCR), wherein a plurality of energy absorbing stages are connected in parallel with said series-connected avalanche diodes, each energy absorbing stage comprising a switching device connected in series with at least one metal oxide varistor (MOV), and wherein a plurality of MOVs are connected in parallel and said switching device is connected in series with said plurality of MOVs.

* * * * *